(12) United States Patent
Naruse et al.

(10) Patent No.: US 6,263,010 B1
(45) Date of Patent: Jul. 17, 2001

(54) SPREAD SPECTRUM COMMUNICATION APPARATUS

(75) Inventors: Akiko Naruse; Arata Obayashi, both of Tokyo; Ken Nakamura, Yokohama, all of (JP)

(73) Assignee: Kabushiki Kaisha Toshiba, Kanagawa-Ken (JP)

( * ) Notice: Subject to any disclaimer, the term of this patent is extended or adjusted under 35 U.S.C. 154(b) by 0 days.

(21) Appl. No.: 09/124,702

(22) Filed: Jul. 29, 1998

(30) Foreign Application Priority Data

Aug. 4, 1997 (JP) .................................................. 9-209091

(51) Int. Cl.$^7$ ...................................................... H04B 2/06
(52) U.S. Cl. ........................... 375/130; 375/145; 370/335; 370/342; 370/516; 455/524
(58) Field of Search ..................................... 375/130, 133, 375/137, 149, 371, 373; 370/320, 335, 331, 342, 441, 516; 445/436, 73, 39, 500, 502, 524

(56) References Cited

U.S. PATENT DOCUMENTS

| | | | |
|---|---|---|---|
| 5,550,811 | * | 8/1996 | Kaku et al. ............................ 370/342 |
| 5,621,414 | * | 4/1997 | Nakagawa ............................. 342/350 |
| 5,627,835 | * | 5/1997 | Witter ................................... 370/320 |
| 5,675,616 | * | 10/1997 | Hulbert et al. ......................... 375/355 |
| 5,950,131 | * | 9/1999 | Vilmur ................................... 455/434 |
| 5,970,084 | * | 10/1999 | Honda ................................... 375/200 |
| 6,021,123 | * | 2/2000 | Mimura ................................. 370/331 |
| 6,175,561 | * | 1/2001 | Storm et al. ........................... 370/342 |

* cited by examiner

*Primary Examiner*—Chi Pham
*Assistant Examiner*—Emmanuel Bayard
(74) *Attorney, Agent, or Firm*—Gray Cary Ware & Freidenrich LLP (57) ABSTRACT

A present invention provides a spread spectrum communication apparatus that acquisition of synchronization of the pilot signal can be conducted in a short time with a high probability when a mobile station stays in the same radio area or in its vicinity. The spread spectrum communication apparatus includes a PN period holding counter is provided in a search receiver, and phase information of the PN code is held in the counter during the power off interval. At the time of operation of synchronization acquisition of a pilot signal conducted when power is turned on again, the operation of synchronization acquisition of the pilot signal is conducted with a preset search width around the phase derived on the basis of the above described held phase information.

11 Claims, 8 Drawing Sheets

SPREAD SPECTRUM COMMUNICATION APPARATUS

BACKGROUND OF THE INVENTION

The present invention relates to a spread spectrum communication apparatus used in a digital cellular radio system adopting a code division multiple access (CDMA) method as a radio channel access method.

In recent years, the spread spectrum communication method immune to interference and disturbance attracts attention as one of communication methods applied to mobile communication systems. The spread spectrum communication method is used mainly to implement a cellular radio system adopting the CDMA method.

In the cellular radio system adopting the CDMA method, a transmitting device modulates digitized audio data and image data by using a digital modulation method such as a PSK modulation method, then converts the modulated data to be transmitted to a wideband baseband signal by using a short code, up-converts the wideband baseband signal to a signal of a radio frequency band, and transmits the up-converted signal. The short codes are generated by shifting a phase of a spreading code having a periodicity. For example, a pseudo random noise code (PN code) is used as the spreading code. On the other hand, a receiving device down-converts the received radio frequency signal to a received signal of an intermediate frequency or a baseband frequency, despreads the down-converted signal using same short code used in the transmitting device, then conducts digital demodulation by using a digital demodulation method such as a PSK demodulation method, and thus reproduces received data.

In other words, in the CDMA method, different short codes are assigned to radio communications between a plurality of mobile stations and a base station to ensure channel separation among radio communications.

When a mobile station starts communication in such a system, it is necessary to establish synchronization for the short code of a pilot signal transmitted by a base station. As its synchronization acquisition method, the following method, for example, has been proposed heretofore.

A PN code has a length of, for example, $2^{15}$ (one period=26.6 msec). Each base station generates a PN code to produce the short codes from a preset different chip phase every radio area managed by its own station. The chip phase whereat generation of the PN code is started is called offset.

When power is turned on, each mobile station first generates a short code from its own PN code generator while successively shifting the chip phase from an arbitrarily set initial reference phase. By monitoring a correlation value between this short code and the short code of the pilot signal broadcast from a base station, the mobile station searches for the offset of the PN code used by the base station. If the offset of the PN code used by the base station is acquired by this search, then a sync channel is received and a system identification (SID) for identifying the mobile communication network is checked. If this SID is one corresponding to a home system in which its own station was registered beforehand, then the mobile station proceeds to a waiting state.

However, such a short code synchronizing method heretofore proposed has the following problem to be solved. Whenever power of the mobile station is turned on in the conventional short code synchronizing method, the mobile station generates a PN code from an arbitrarily set initial phase and conducts the operation for acquiring the synchronization of the pilot signal as described above. Even in the case where, for example, the power of the mobile station is temporarily turned off and the power of the mobile station is turned on again without moving from that radio area, therefore, the mobile station necessarily generates a PN code from the initial reference phase and acquires the synchronization of the pilot signal. As a result, it takes a long time to acquire the synchronization of the short code, depending upon the positional relation between the offset of the PN code to be acquired and the initial reference phase of the mobile station.

BRIEF SUMMARY OF THE INVENTION

The present invention has been made in view of the above described situations. An object of the present invention is to provide such a spread spectrum communication apparatus that acquisition of synchronization of the pilot signal can be conducted in a short time with a high probability when a mobile station stays in the same radio area or in its vicinity.

In accordance with one aspect of the present invention, there is provided a spread spectrum communication apparatus for transmitting/receiving digital signals to/from a base station in a spread spectrum form by using a spreading code having a periodicity and having a different offset value for each radio area comprising: spreading code generation means for generating a plurality of short codes by shifting a phase of the spreading code, during a synchronization acquisition interval for a pilot signal transmitted by the base station; signal search means for conducting synchronization acquisition of the pilot signal on the basis of a correlation between a short code of the pilot signal and each of the generated short codes and for recognizing a timing information of the spreading code when the short code of the pilot signal and the generated short code are synchronized; and phase holding means for holding the recognized timing information during power off interval and controlling a phase of generation start of the spreading code conducted by the spreading code generation means on the basis of the held information when power is turned on again.

Even if power of the apparatus is turned off, therefore, the phase information of the spreading code obtained before power is turned off is held during the power off interval according to the present invention. When power is turned on again, the synchronization acquisition operation of the pilot signal is started on the basis of the held phase information. In the case where the communication apparatus stays within the same radio area or in the vicinity thereof, therefore, the synchronization acquisition can be achieved in a shorter time than the conventional technique.

When power is turned on again, the phase of generation start of the spreading code conducted by the spreading code generation means is preferably set to a position delayed from a phase derived on the basis of the phase information held during the power off interval by a predetermined phase value. By doing so, the synchronization acquisition with high certainty considering the propagation delay time difference of the pilot signal from the base station can be conducted, even when the apparatus has largely moved within the radio area during the power off interval, and consequently the distance between the base station and the apparatus at the time when power is turned on again has largely changed from that at the time when power is turned off.

Furthermore, after power is turned on again, the synchronization acquisition operation is preferably monitored. If the synchronization acquisition of the pilot signal of acquisition subject cannot be conducted while the spreading code is shifted by a predetermined value, then preferably the generation phase of the spreading code is reset to a predetermined reference phase, and the synchronization acquisition of the pilot signal is conducted from the reference phase.

By doing so, a shift to the synchronization acquisition from the reference phase is conducted in the case where the pilot signal of acquisition subject could not be acquired during a predetermined phase shift interval for some reasons. Therefore, repetition of the synchronization acquisition operation within a predetermined phase range for an indefinite time is prevented. As a result, the pilot signal can be acquired certainly.

Furthermore, after the synchronization acquisition of the pilot signal of the acquisition subject has been conducted by the signal search means when power is turned on again, the second control means causes the signal search means to conduct signal search operation for another pilot signal including another short code with different offset of the spreading code, and if another pilot signal having a larger correlation value with the another short code than the pilot signal under acquisition has been detected, the second control means effects such control as to change over the subject of synchronization acquisition to the another pilot signal.

By doing so, the subject of acquisition can be automatically changed over to a pilot signal yielding a higher receiving quality after the synchronization acquisition. In the case where the apparatus moves in the vicinity of the boundary of the radio area or the receiving quality of the pilot signal is not so good because of a radio wave obstruction or the like, therefore, a pilot signal yielding a better radio wave propagation condition can be acquired.

In accordance with another aspect of the present invention, there is provided a spread spectrum communication apparatus for transmitting/receiving digital signals to/from a base station in a spread spectrum form by using a spreading code having a periodicity and having a different offset value for each radio area, comprising: spreading code generation means for generating a plurality of short codes by shifting a phase of the spreading code, during a synchronization acquisition interval for a pilot signal transmitted by the base station; signal search means for conducting synchronization acquisition of the pilot signal on the basis of a correlation between a short code of the pilot signal and each of the generated short codes; receiving means for receiving a synch channel signal; and phase holding means for recognizing and holding offset information representing an offset value of the pilot signal subjected to synchronization acquisition from system synchronization timing and system synchronization timing information from the received synch channel signal during power off interval and controlling a phase of generation start of the spreading code for receiving conducted by the spreading code generation means on the basis of the held information when power is turned on again.

Even if the power of the apparatus is turned off, therefore, the phase information of the spreading code obtained before power is turned off is held during power off interval according to the present invention. When power is turned on again, the synchronization acquisition operation of the pilot signal is started on the basis of the held phase information. In the case where the communication apparatus stays within the same radio area or in the vicinity thereof, therefore, the synchronization acquisition can be achieved in a shorter time as compared with the conventional technique.

In accordance with another aspect of the present invention, there is provided a radio communication apparatus for use in a radio communication system, the apparatus communicating a signal with a base station, the signal being spread by a code, the base station broadcasting a pilot signal, comprising: generating means for generating a plurality of codes during a time period for receiving the pilot signal; signal search means for conducting synchronization acquisition of the pilot signal on the basis of correlation between each of the generated codes and the received pilot signal and for recognizing a timing information when the pilot signal and the generated code are synchronized; and controlling means for storing the recognized information while a power of the apparatus is turned off and controlling a sequence of generating the codes based on the stored information after the power of the apparatus is turned on.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
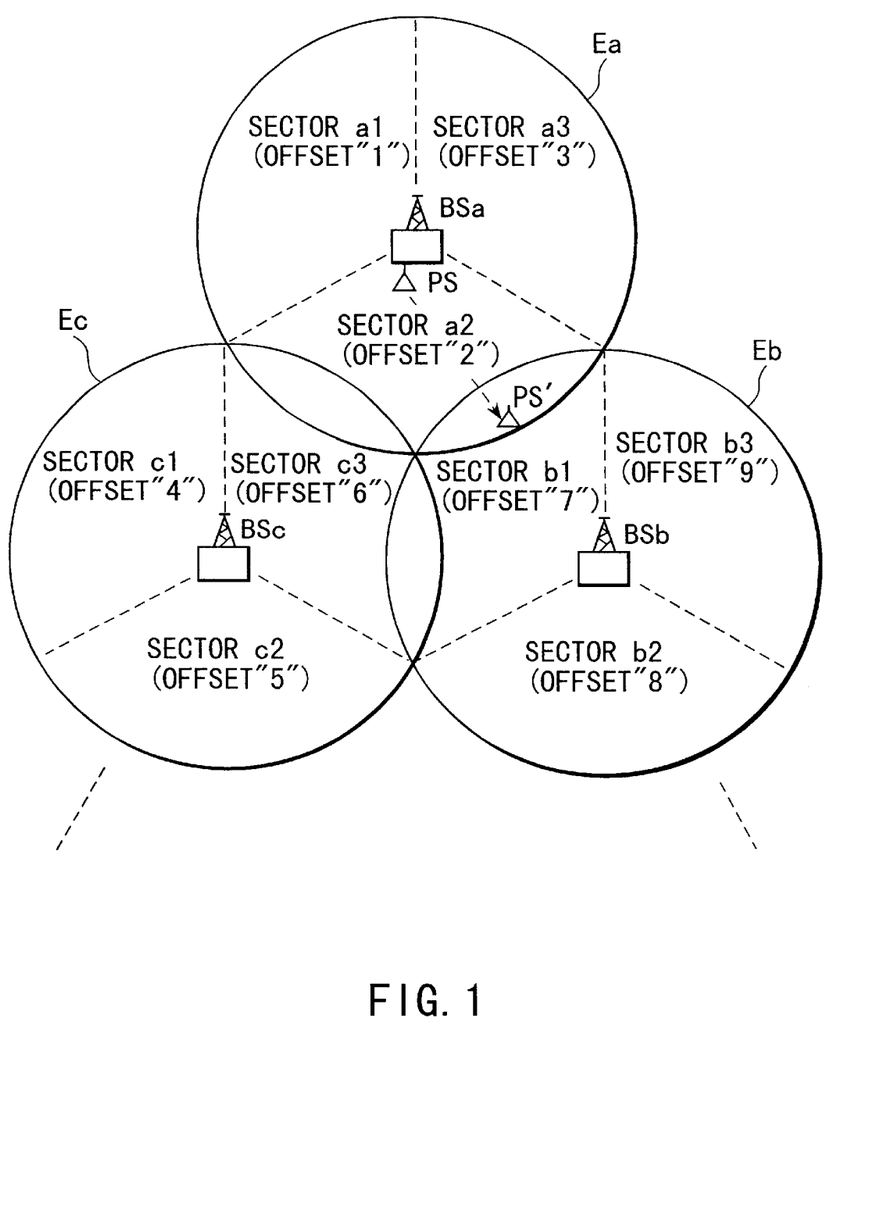
FIG. 1 is a schematic configuration diagram showing a first embodiment of a CDMA cellular radio system according to the present invention.

FIG. 1 is a schematic configuration diagram showing a first embodiment of a CDMA cellular radio system according to the present invention, and BSa, BSb and BSc denote base stations. These base stations BSa, BSb and BSc are connected to a mobile communication control station, which is not illustrated, via respective communication lines. They are furthermore connected to a public network via the mobile communication control station. The base stations BSa, BSb and BSc form radio zones Ea, Eb and Ec called cells, respectively. The radio zone Ea is divided into three radio areas a1, a2 and a3 called sectors. The radio zone Eb is divided into three radio areas b1, b2 and b3 called sectors. The radio zone Ec is divided into three radio areas c1, c2 and c3 called sectors. The base stations BSa, BSb and BSc sets offset values of the spreading code of the sectors a1, a2, a3, b1, b2, b3, c1, c2 and c3 to mutually different values.

In the radio zones Ea, Eb and Ec, a mobile station PS is connected to a corresponding base station via a radio channel. Thus communication can be conducted. As the access method for the radio channel, the CDMA method is used. When power is turned on, the mobile station PS conducts the synchronization acquisition operation for a short code of the pilot signal transmitted by a base station. This synchronization acquisition operation is conducted by searching the PN offset associated with the sector in which its own apparatus is located, out of the offsets of the PN code different from sector to sector as described above.

Figure 2:
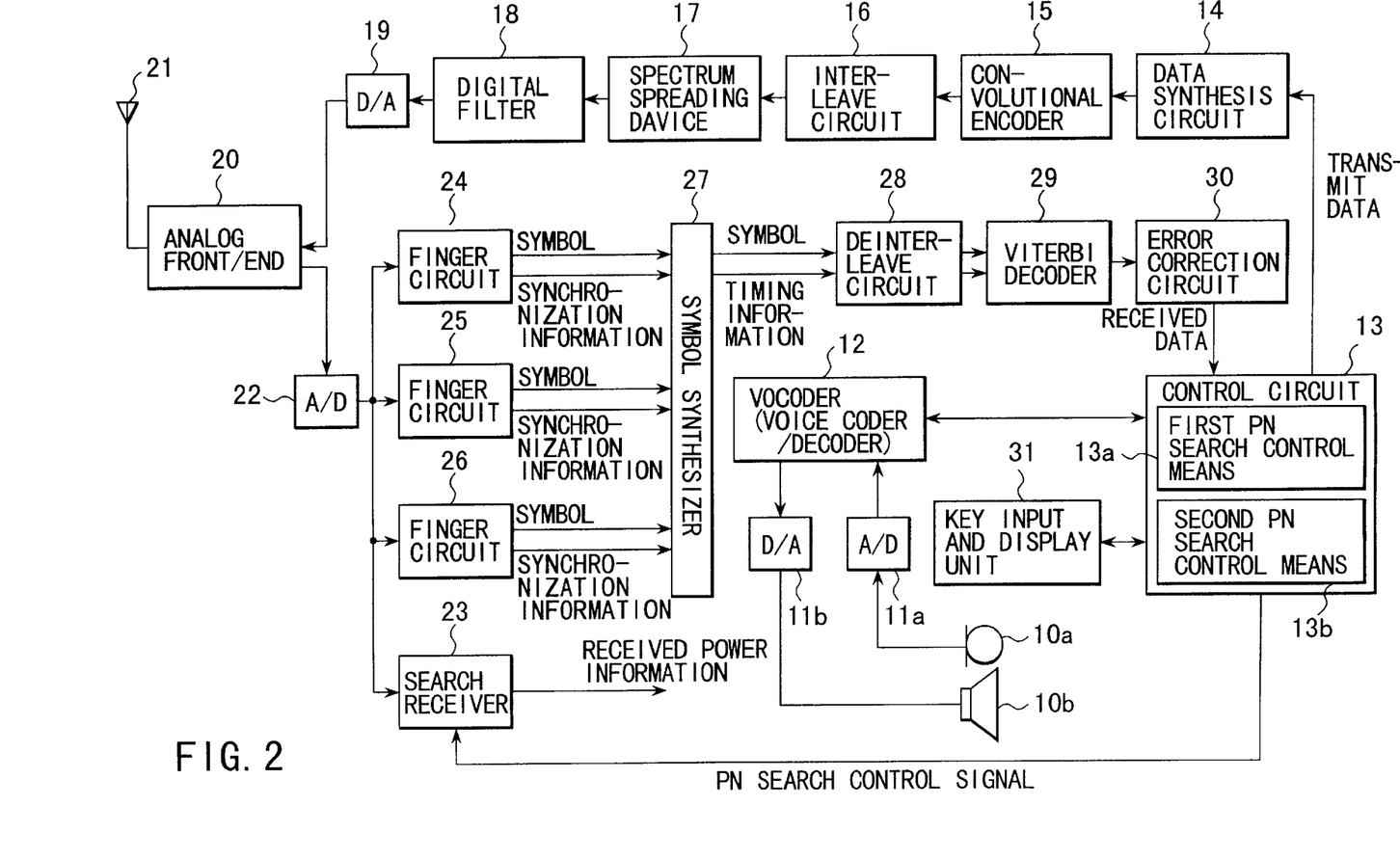
FIG. 2 is a circuit block diagram showing the configuration of a spread spectrum communication apparatus used as a mobile station in the system shown in FIG. 1.

FIG. 2 is a circuit block diagram showing the configuration of a spread spectrum communication apparatus used as the above described mobile station PS.

In FIG. 2, a transmit voice signal of a talker output from a microphone 10a is converted to a digital signal by an analog/digital converter (A/D) 11a, then encoded by a voice coder/decoder (hereafter referred to as vocoder) 12, and then input to a control circuit 13. In the control circuit 13, a control signal and so are added to a coded transmit voice signal output from the vocoder 12. As a result, transmit data is generated.

In a data synthesis circuit 14, an error detection code and an error correction code are added to the transmit data. Resultant transmit data is encoded in a convolutional encoder 15, and subjected to processing for interleaving in an interleave circuit 16. Transmit data output from the interleave circuit 16 is subjected to spectrum spreading by a short code in a spectrum spreading device 17, resulting in a wideband signal. In a digital filter 18, unnecessary frequency components are removed from the transmit signal subjected to spectrum spreading. A resultant transmit signal is then converted to an analog signal by a digital/analog converter (D/A) 19. In an analog front/end 20, the analog transmit signal is up-converted to a predetermined radio channel frequency and subjected to power amplification to have a predetermined transmit power level. Thereafter, the amplified transmit signal is transmitted from an antenna 21 to the base stations BSa, BSb and BSc which are not illustrated.

On the other hand, a radio signal received by the antenna 21 is subjected to low-noise amplification and down-converted to an intermediate frequency or a baseband frequency in the analog front/end 20. The received signal output from the analog front/end 20 is converted to a digital signal with a predetermined sampling period in an analog/digital converter (A/D) 22, and then input to a search receiver 23 and three finger circuits 24, 25 and 26.

Each of the finger circuits 24, 25 and 26 includes an initial acquisition portion, a clock tracking portion, and a data demodulation portion. Among them, the data demodulation portion conducts spectrum despreading on the received transmit signal transmitted from a base station, and integrates a resultant signal over one symbol interval in an integrating dump filter. The reasons for providing three finger circuits are to receive a multi-path received signal with a high signal-to-noise ratio by using a path diversity effect and to change over connected base stations during communication without disconnecting the radio channel, i.e., conduct so-called soft hand off.

Symbols demodulated by the finger circuits 24, 25 and 26 are input to a symbol synthesizer 27 together with synchronization information and combined together. The combined demodulated symbols are input to a deinterleave circuit 28 together with timing information, and subjected to deinterleave processing in the deinterleave circuit 28. Subsequently, demodulated symbols after deinterleaving are subjected to Viterbi decoding in a Viterbi decoder 29. The demodulated symbols after subjected to Viterbi decoding is subjected to error correcting decoding in an error correction circuit 30, and input to the control circuit 13 as received data. In the control circuit 13, the received data thus input thereto is separated into voice data and control data. Among them, the voice data is subjected to voice decoding in the vocoder 12, then converted to an analog signal in a digital/analog converter (D/A) 11b, and then output from a speaker 10b as a loudspeaking voice.

A key input and display unit 31 is provided for the user to input dial data and control data by using keys or for displaying various kinds of information concerning the operation state of the mobile station PS. Operation of this key input and display unit 31 is controlled by the control circuit 13.

Figure 3:
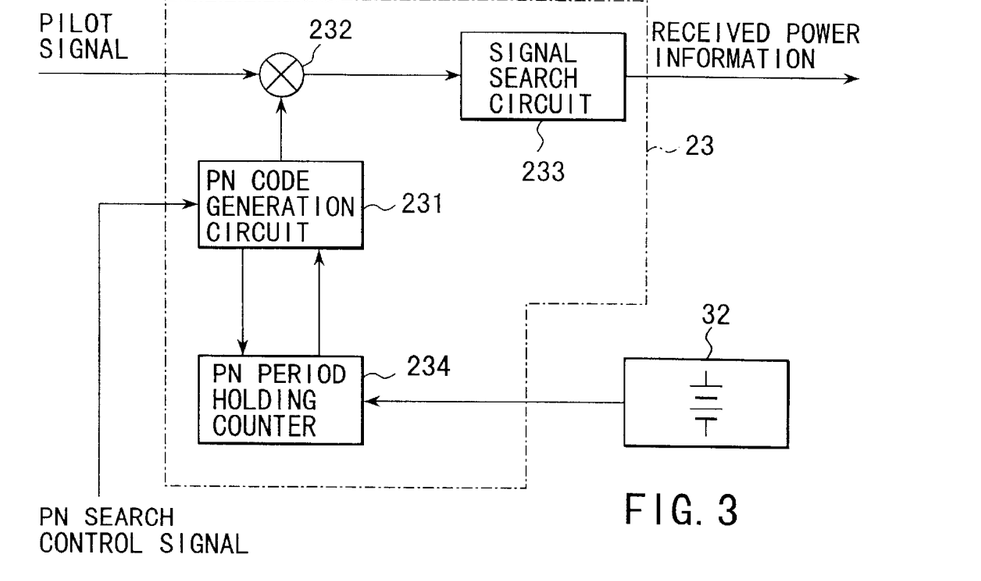
FIG. 3 is a circuit block diagram showing the configuration of a search receiver of the spread spectrum communication apparatus shown in FIG. 2.

By the way, the search receiver 23 is provided to search a PN code of a pilot signal broadcast from the base stations BSa, BSb and BSc and acquire the offset. The search receiver 23 has the following configuration. FIG. 3 is a circuit block diagram showing the configuration.

A pilot signal received by the analog front/end 20 and converted to a digital signal by the A/D converter 22 is input to a correlator 232. In this correlator 232, the short code of the received pilot signal and the short code generated from a PN code generation circuit 231 are correlated and the correlation value is input to a signal search circuit 233. In the signal search circuit 233, received power information is detected on the basis of the correlation value. The detected value of the received power information is input to the control circuit 13.

Furthermore, in the search receiver 23 of the present embodiment, a PN period holding counter 234 is provided. This PN period holding counter 234 operates using power supplied from a backup power supply 32 even after the power supply of the apparatus is turned off and holds the phase information of the PN code of the PN code generation circuit 231 obtained before power is turned off. When power is turned on again, a phase derived on the basis of the phase information of the PN code thus held is supplied to the PN code generation circuit 231 as an initial phase.

The control circuit 13 includes, for example, a microcomputer as a main controller. Besides various ordinary control functions concerning the communication operation, the control circuit 13 includes a first PN search control means 13a and a second PN search means 13b.

The first PN search control means 13a is used in the case where the short code synchronization is not achieved by the second PN search control means 13b as described later. The first PN search control means 13a supplies an initial reference phase of the PN code arbitrarily set for each mobile station PS to the PN code generation circuit 231 and causes PN code shift operation for the PN search of the pilot signal to be started from this initial reference phase.

Figure 4:
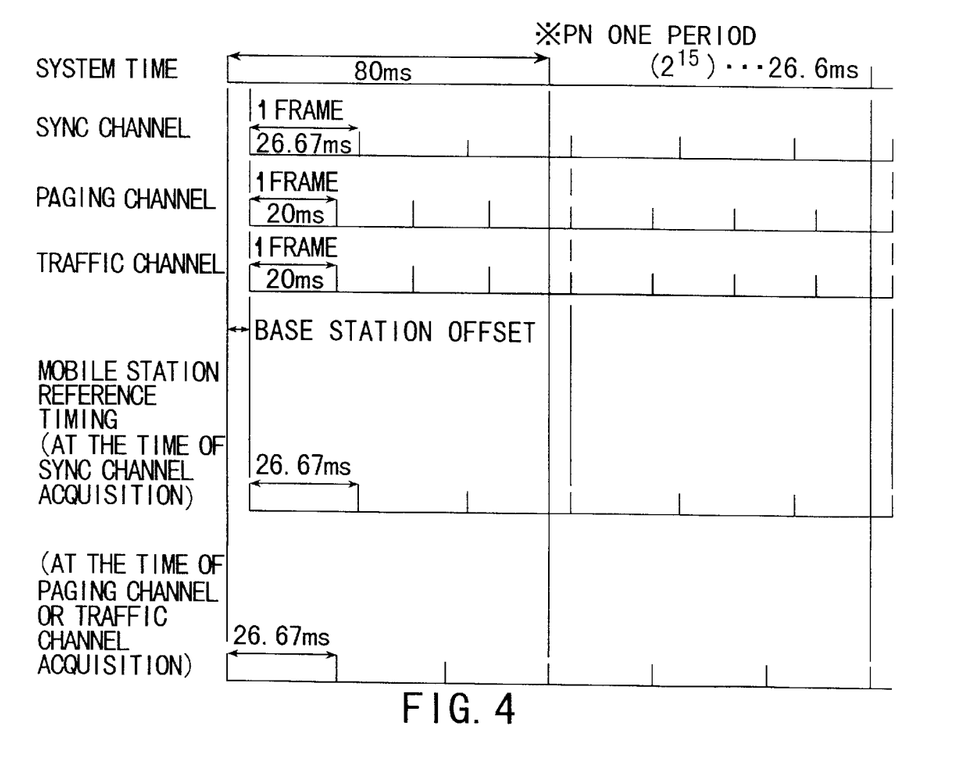
FIG. 4 is a timing diagram to be used in description of operation of each embodiment of the present invention.

The second PN search control means 13b is used in order to conduct synchronization acquisition in a short time in the case where power of the mobile station PS is turned on again in a radio area where power of the mobile station was turned off, or in the vicinity of the radio area. The second PN search control means 13b supplies a phase derived on the basis of the phase information of the PN code held in the PN period holding counter 234 to the PN code generation circuit 231, and causes PN code shift operation for PN search of the received pilot signal to be started from this initial phase. By the way, the phase information of the PN code held in the PN period holding counter 234 is reference timing of the mobile station PS at the timing of acquisition of the sync channel, i.e., timing delayed from the system time by the offset of the acquired base station as shown in FIG. 4.

A PN search operation in the mobile station having the configuration heretofore described will now be described.

Figure 5:
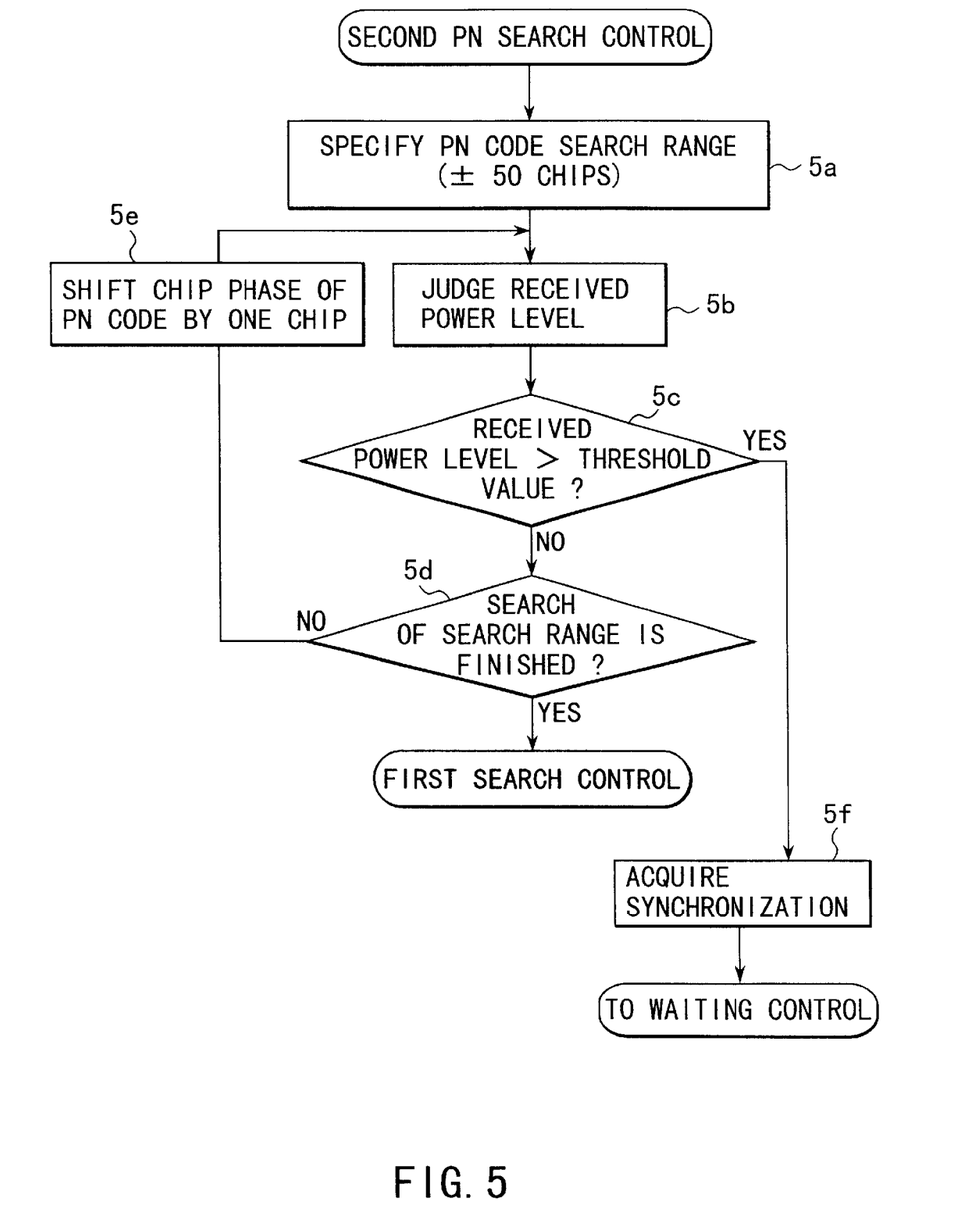
FIG. 5 is a flow chart showing a procedure of a second PN search control and its control contents.

If power is turned on in the mobile station PS, the control circuit 13 starts PN search control according to second PN search control procedure. FIG. 5 is a flow chart showing the procedure.

At step 5a, the control circuit 13 supplies a phase derived on the basis of the phase information of the PN code held in the PN period holding counter 234 to the PN code generation circuit 231 of the search receiver 23, and specifies a search width of the PN code. This search width is provided in order to ensure acquisition of the short code synchronization, in the case where the mobile station has moved in a sector from the time point of turning off power, by considering the propagation time difference of the pilot signal between before the movement and after the movement. The search width is set to a value larger than the propagation delay time difference corresponding to the maximum diameter of the sector. If the mobile station moves by, for example, 10 km, the propagation delay time difference of the pilot signal becomes a value corresponding to 40 chips of the PN code. In the case of a system having 10 km as the maximum diameter of the sector, the search width of the PN code is set to ±50 chips.

As the initial value, the PN code generation circuit 231 sets the PN code phase information held in the PN period holding counter 234, such as a phase obtained by subtracting 50 chips from offset "2." Thereafter, the PN code generation circuit 231 generates short codes while shifting the phase of the PN code chip by chip according to a command given by the control circuit 13. In the search receiver 23, the correlation value between this short code and the short code of received pilot signal is derived by the correlator 232, whenever the PN code is shifted by one chip. On the basis of the correlation value, the received power level is detected by the signal search circuit 233.

Figure 6:
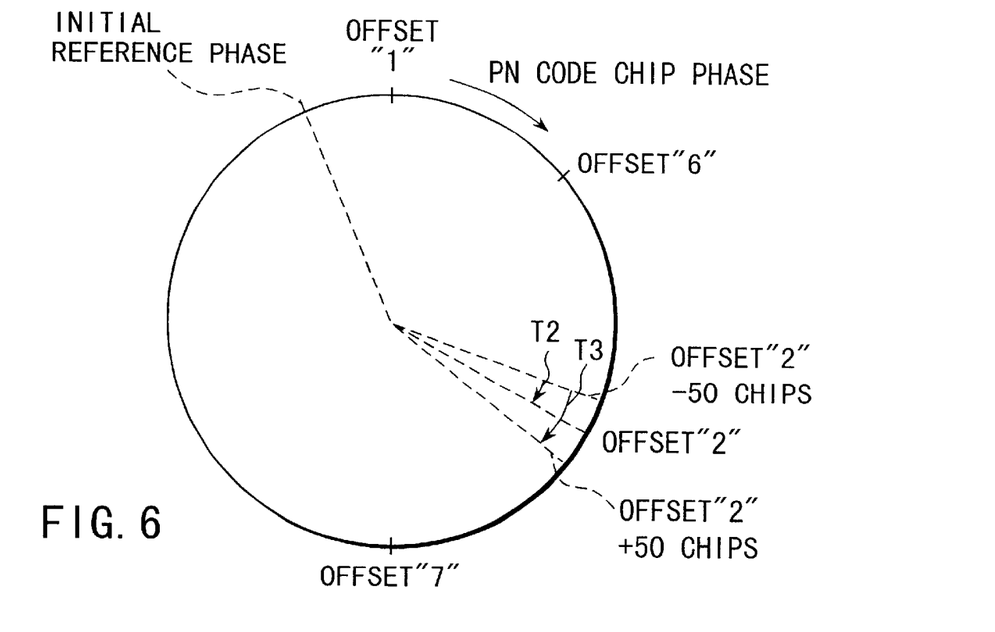
FIG. 6 is a diagram illustrating phase shift operation of a PN code in the second search control.

At step 5b, the control circuit 13 compares the received power level with a threshold value. If the received power level is the threshold value or less, then the control circuit 13 judges the PN code phase of the pilot signal still undetected, and proceeds from step 5c to step 5d. The control circuit 13 determines whether the PN search of the preset search width (±50 chips) has been finished. If it has not been finished, the control circuit 13 proceeds to step 5e. At step 5e, the control circuit 13 shifts the generation phase of the PN code generated by the PN code generation circuit 231 by one more chip, and conducts the level decision between the received power level and the threshold value again at the step 5b. Thereafter, the processing heretofore described is repeated in the same way until received power level exceeding the threshold value is detected within the range of the set search width (±50 chips). FIG. 6 shows the phase change of the PN code in the PN search operation.

Figure 7:
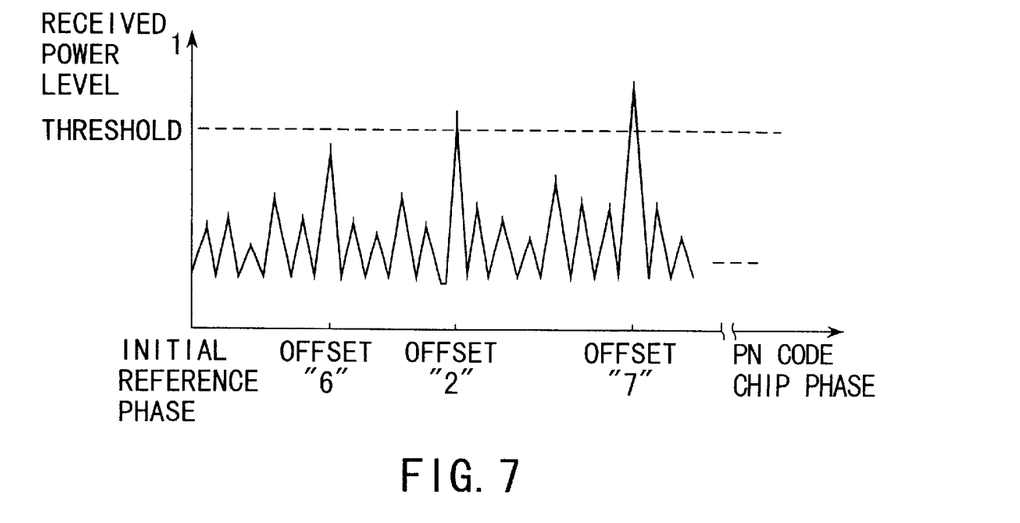
FIG. 7 is a diagram showing a received waveform of a signal detected by the second PN search control.

It is now assumed that during the search operation heretofore described the phase of the PN code generated by the PN code generation circuit 231 has coincided with the PN offset "2" of the pilot signal transmitted toward a sector a2 by the base station BSa. Thereupon, the received power level output from the search receiver 23 exceeds the threshold value as shown in FIG. 7. Therefore, the control circuit 13 judges that the pilot signal transmitted from a desired base station has been received, and proceeds from the step 5c to step 5f. At the step 5f, the control circuit 13 stops the phase shift of the PN code generated by the PN code generation circuit 231. Thus the short code synchronization is established. Thereafter, the mobile station proceeds to waiting operation.

Figure 8:
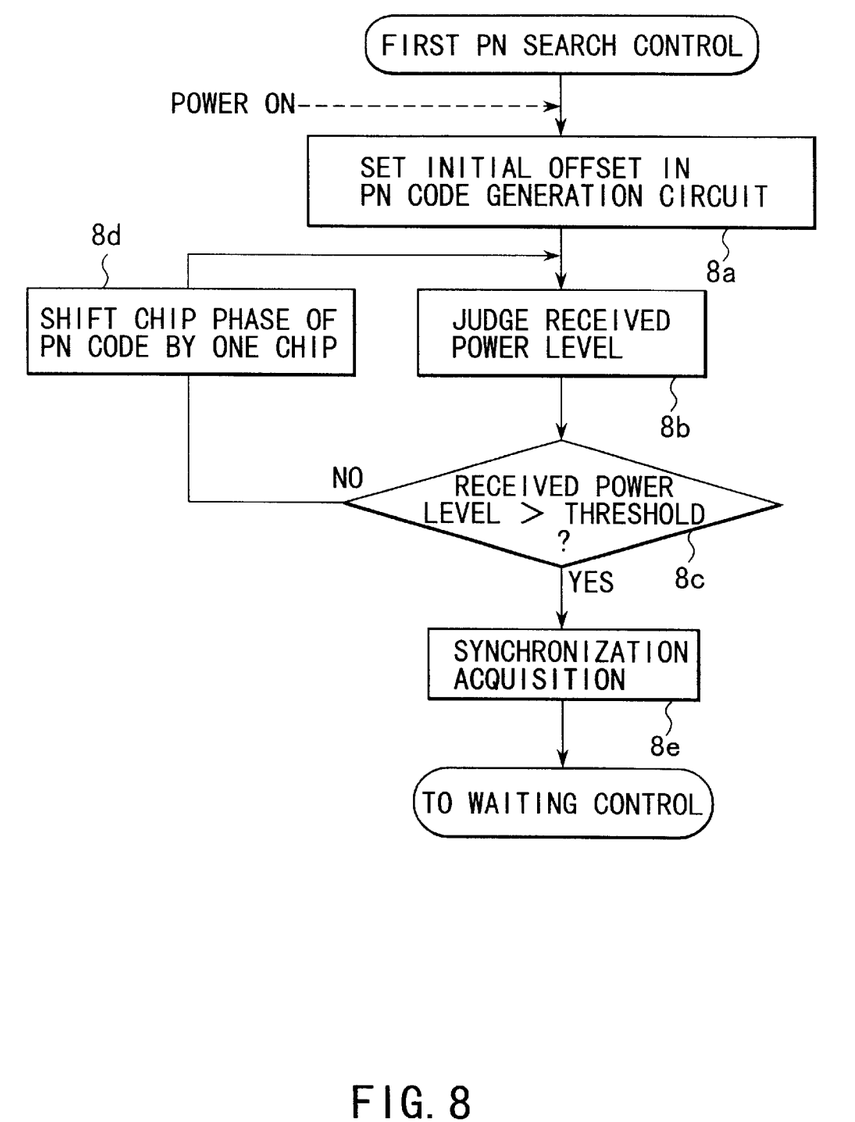
FIG. 8 is a flow chart showing a procedure of a first PN search control and its control contents.

On the other hand, if the pilot signal could not be acquired by the PN search operation within the above described search width (±50 chips), then the control circuit 13 proceeds from the step 5d to a first search control mode, and conducts the PN search operation again. FIG. 8 is a flow chart showing the procedure and contents of the first PN search control.

At step 8a, the control circuit 13 provides the PN code generation circuit 231 of the search receiver 23 with the initial reference phase, and causes the phase shift operation of the PN code to be started from the initial reference phase. Thereupon, in the search receiver 23 whenever the PN code generated by the PN code generation circuit 231 is shifted by one chip, the correlation value between this short code and the short code of the received pilot code is derived. Furthermore, from the correlation value, the received power level is detected. The detected value information is taken in the control circuit 13.

Figure 9:
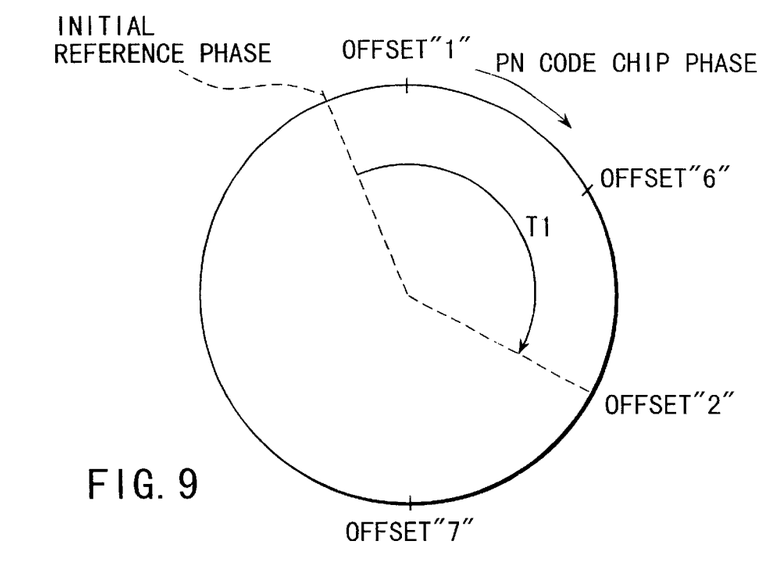
FIG. 9 is a diagram illustrating phase shift operation of a PN code in the first search control.

At step 8b, the control circuit 13 compares the above described received power level with the threshold value. If the received power level is the threshold value or the less, the control circuit 13 judges the short code synchronization to be still undetected, and proceeds from step 8c to step 8d. And at step 8d, the control circuit 13 shifts the generation phase of the PN code generated by the PN code generation circuit 231 by one chip, and causes the level decision with the threshold value at the step 8b. Thereafter, the processing heretofore described is repeated in the same way until received power level exceeding the threshold value is detected. FIG. 9 shows the phase change of the PN code in this PN search operation.

Figure 10:
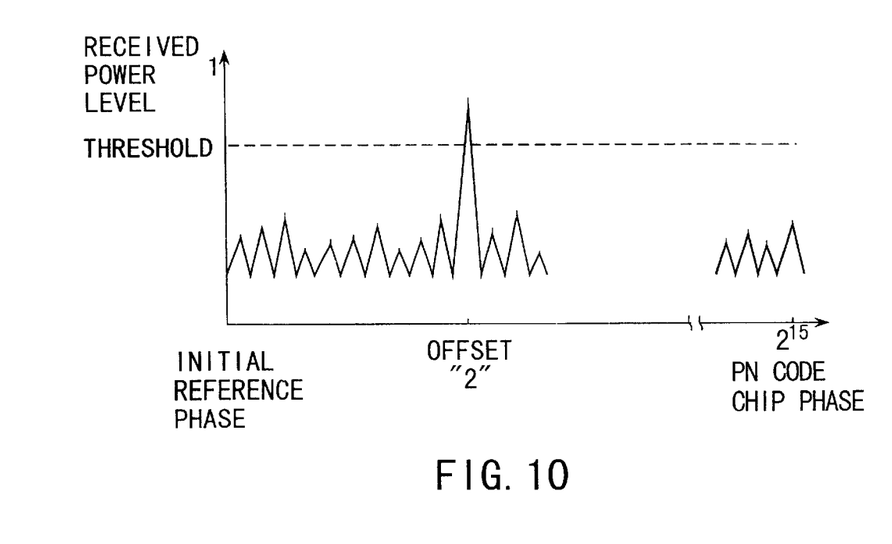
FIG. 10 is a diagram showing a received waveform of a signal detected by the first PN search control.

It is now assumed that during the search operation heretofore described the phase of the PN code generated by the PN code generation circuit 231 has coincided with the PN offset "2" of the pilot signal transmitted toward the sector a2 by the base station BSa. Thereupon, the received power level output from the search receiver 23 exceeds the threshold value as shown in FIG. 10. Therefore, the control circuit 13 judges that the pilot signal transmitted from a desired base station has been received, and proceeds from the step 8c to step 8e. At the step 8e, the control circuit 13 stops the phase shift of the PN code generated by the PN code generation circuit 231. Thus the short code synchronization is established. Thereafter, the mobile station PS proceeds to waiting operation.

Figure 11:
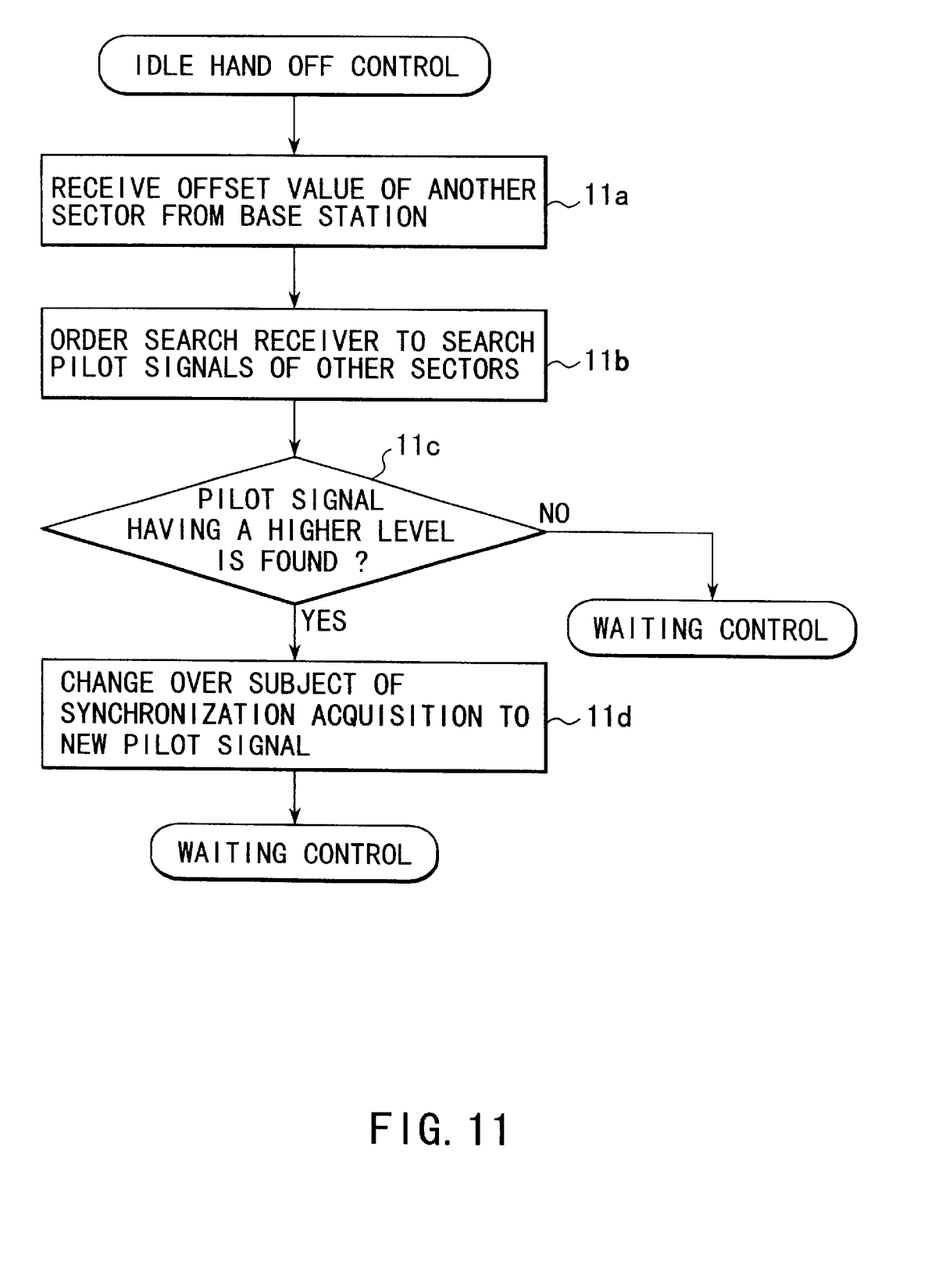
FIG. 11 is a flow chart showing a procedure of an idle hand off control after power is turned on again and showing its control contents.

If the mobile station PS has proceeded to the waiting state as heretofore described, the mobile station PS executes the idle hand off control. The reason for executing the idle hand off control is that in the case where the mobile station PS has moved to, for example, the vicinity of the boundary between the sector a2 and another sector b1 as represented by PS' of FIG. 1, it is sometimes desirable to acquire a pilot signal directed to another sector yielding a higher received level than the pilot signal being now under acquisition. Therefore, this idle hand off control is effected. FIG. 11 is a flow chart showing its control procedure.

At step 11a, the control circuit 13 first receives a neighbor list message notified by the base station BSa, and extracts an offset value of another neighbor sector from this message. At step 11b, the control circuit 13 orders the search receiver 23 to conduct a PN search for acquiring a pilot signal directed to the other neighbor sector.

If a pilot signal having a received power level exceeding the threshold value is detected by this PN search operation, the control circuit 13 determines at step 11c whether the received power level of this newly detected pilot signal is higher than the received power level of the pilot signal currently under the short code synchronization acquisition. If, for example, a pilot signal (PN offset "7") having a higher received power level than the pilot signal (PN offset "2") currently under the short code synchronization acquisition is detected as shown in FIG. 7, then the subject of the synchronization acquisition is changed over to this newly received pilot signal at step 11d, and the control circuit 13 proceeds to the waiting state again after this changeover.

In the first embodiment of the present invention as heretofore described, the PN period holding counter 234 is provided in the search receiver 23, and phase information of the PN code is held in the PN period holding counter 234 during the power off interval. At the time of operation of the short code synchronization acquisition of the pilot signal conducted when power is turned on again, the operation of the short code synchronization acquisition of the pilot signal is conducted with a preset search width around the phase derived on the basis of the above described held phase information.

If power is turned on again in such a state that the mobile station PS does not move to another sector, it becomes possible to conduct the synchronization acquisition of the pilot signal with a high probability in a short time by utilizing the synchronization phase information obtained before power is turned off. For example, in the example shown in FIG. 6, the time required for the short code synchronization acquisition of the pilot signal is T2 which is approximately ½ of the PN search width. At most, it takes only T3 corresponding to 100 chips of the PN code which is the PN code search width. On the other hand, in the case where the PN code search is started always from an arbitrary initial reference phase, when power is turned on again, a time corresponding to T1 of FIG. 9 is required.

A search width according to the propagation delay time difference corresponding to the maximum diameter of a sector is set and the short code synchronization acquisition is conducted within this search width. Consequently, even if the mobile station has moved from an end of a sector to another end thereof during the power off interval, therefore, the short code synchronization acquisition can be conducted certainly without missing the pilot signal of the base station acquired before power was turned off.

If, as a result of the search in the range of the above described search width, a desired pilot signal could not be acquired due to, for example, temporary deterioration of the radio wave propagation condition, then the phase of the PN code of the search receiver 23 is set to an arbitrary initial reference phase, and the first PN search control is executed. As a result, the pilot signal from the desired base station can be acquired certainly.

Furthermore, in the waiting state after the short code synchronization acquisition, the idle hand off control is executed. Therefore, in the case where a pilot signal yielding a larger received power level than the acquired pilot signal could be received, the subject of acquisition of the short code synchronization is changed over to the newly received pilot signal and a shift to the waiting state is conducted.

Without fixing the subject of the short code synchronization acquisition to the pilot signal obtained before power is turned off, therefore, the best pilot signal according to the position of the mobile station PS at that time can be acquired. Since idle hand off is conducted by the mobile station on the basis of individual decision without receiving a command from the base station, it can be carried out by a simple procedure without casting a control burden upon the network side such as the base station.

As the first embodiment, there has been described the case where the reference timing (timing delayed from the system time by the offset of the acquired base station) of the mobile station obtained at the timing of acquisition of the sync channel is held in the PN period holding counter 234 during the power off interval and the short code synchronization acquisition operation of the pilot signal is conducted on the basis of the held timing when power is turned on again.

In some systems, however, it might be necessary to hold information of the system synchronization timing (timing synchronized with the system time) and the offset value information of the acquired base station during the power off interval, in order to acquire a base station in a short time when power is turned on again. In a second embodiment of the present invention, these kinds of information is held and the synchronization acquisition is conducted using these information when power is turned on again.

In other words, as shown in FIG. 4, the mobile station PS is synchronized to the system time (system reference timing) after the sync channel is acquired. During the power off interval, a counter for generating synchronized to the system reference timing is made to operate, and the offset of the base station acquired before power is turned off is held in a RAM included in the control circuit 13. When power is turned on again, the vicinity of the offset of the base station to be acquired is preferentially subjected to the PN search on the basis of timing held in the counter and the offset of the base station held in the RAM. The control procedure and control contents of the PN search are the same as those of the second PN search control described with reference to the first embodiment.

The present invention is not limited to the above described embodiments. For example, the PN search width in the second PN search control may not be fixed, but may be variably set to an optimum value from sector to sector. This can be implemented as follows. The PN search width corresponding to the maximum diameter of each sector is stored in the memory within the control circuit 13 beforehand so as to be associated with the sector name or PN offset. When starting the search control, the mobile station reads out the search width corresponding to the sector of the acquisition subject from the above described memory, and sets it in the search receiver 23.

Furthermore, the first embodiment has been described by taking such a system that one cell is divided into three sectors and these sectors are provided with different PN offsets as an example. Alternatively, the present invention may be applied to such a system that each cell is provided with different PN offsets or such a system that a plurality of cells or radio areas are provided with different PN offsets.

Besides, as for the procedure and control contents of the first PN search control and the second PN search control, the circuit configuration of the spread spectrum communication apparatus, the kind and configuration of the mobile communication system, and the set value of the PN offset as well, the present invention can be implemented in various variations in such a range as not to depart from the spirit of the invention.

According to the present invention, the means for holding the phase of the spreading code is provided, as described in detail heretofore. During the power off interval, the phase information of the spreading code in the spreading code generation means is held in the state obtained during the power on interval. When power is turned on again, the generation start phase of the spreading code in the spreading code generation means is controlled on the basis of the phase information thus held. As a result, it is possible to provide a spread spectrum communication apparatus capable of raising the probability of acquiring the short code synchronization of the pilot signal with short time, when the mobile station stays within the same radio area or in the vicinity thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A spread spectrum communication apparatus for transmitting/receiving digital signals to/from a base station in a spread spectrum form by using a spreading code having a periodicity and having a different offset value for each radio area comprising:

spreading code generation means for generating a plurality of short codes by shifting a phase of the spreading code, during a synchronization acquisition interval for a pilot signal transmitted by said base station;

signal search means for conducting synchronization acquisition of said pilot signal on the basis of a correlation between a short code of the pilot signal and each of the generated short codes and for recognizing a timing information of the spreading code when the short code of the pilot signal and the generated short code are synchronized; and phase holding means for holding the recognized timing information during power off interval and controlling a phase of generation start of the spreading code conducted by said spreading code generation means on the basis of said held information when power is turned on again.

2. A spread spectrum communication apparatus according to claim 1, wherein said phase holding means sets the phase of generation start of the spreading code conducted by said spreading code generation means to a position delayed from a phase derived on the basis of said information held during the power off interval by a predetermined phase value, when power is turned on again.

3. A spread spectrum communication apparatus according to claim 1, further comprising first control means, wherein after power is turned on again, said first control means monitors the synchronization acquisition operation conducted by said signal search means, and if synchronization acquisition of a pilot signal of an acquisition subject cannot be conducted while said spreading code is shifted by a predetermined value, said first control means causes said signal search means to conduct the synchronization acquisition operation of the pilot signal, by shifting the phase of generation of the spreading code for receiving by said spreading code generation means from an arbitrarily determined reference phase by said predetermined value at a time.

4. A spread spectrum communication apparatus according to claim 2, further comprising first control means, wherein after power is turned on again, said first control means monitors the synchronization acquisition operation conducted by said signal search means, and if synchronization acquisition of a pilot signal of an acquisition subject cannot be conducted while said spreading code is shifted by a predetermined value, said first control means causes said signal search means to conduct the synchronization acquisition operation of the pilot signal, by shifting the phase of generation of the spreading code for receiving by said spreading code generation means from an arbitrarily determined reference phase by said predetermined value at a time.

5. A spread spectrum communication apparatus according to claim 1, further comprising second control means, wherein after the synchronization acquisition of the pilot signal of the acquisition subject has been conducted by said signal search means when power is turned on again, said second control means causes said signal search means to conduct signal search operation for another pilot signal including another short code with different offset of the spreading code, and if another pilot signal having a larger correlation value with the another short code than said pilot signal under acquisition has been detected, said second control means effects such control as to change over the subject of synchronization acquisition to said another pilot signal.

6. A spread spectrum communication apparatus for transmitting/receiving digital signals to/from a base station in a spread spectrum form by using a spreading code having a periodicity and having a different offset value for each radio area, comprising:

spreading code generation means for generating a plurality of short codes by shifting a phase of the spreading code, during a synchronization acquisition interval for a pilot signal transmitted by said base station;

signal search means for conducting synchronization acquisition of said pilot signal on the basis of a correlation between a short code of the pilot signal and each of the generated short codes;

receiving means for receiving a synch channel signal; and phase holding means for recognizing and holding offset information representing an offset value of said pilot signal subjected to synchronization acquisition from system synchronization timing and system synchronization timing information from the received synch channel signal during power off interval and controlling a phase of generation start of the spreading code for receiving conducted by said spreading code generation means on the basis of said held information when power is turned on again.

7. A spread spectrum communication apparatus according to claim 6, wherein said phase holding means sets the phase of generation start of the spreading code conducted by said spreading code generation means to a position delayed from a phase derived on the basis of said held information held during the power off interval by a predetermined phase value, when power is turned on again.

8. A spread spectrum communication apparatus according to claim 6, further comprising first control means, wherein after power is turned on again, said first control means monitors the synchronization acquisition operation conducted by said signal search means, and if synchronization acquisition of a pilot signal of an acquisition subject cannot be conducted while said spreading code is shifted by a predetermined value, said first control means causes said signal search means to conduct the synchronization acquisition operation of the pilot signal, by shifting the phase of generation of the spreading code for receiving by said spreading code generation means from an arbitrarily determined reference phase by said predetermined value at a time.

9. A spread spectrum communication apparatus according to claim 7, further comprising first control means, wherein after power is turned on again, said first control means monitors the synchronization acquisition operation conducted by said signal search means, and if synchronization acquisition of a pilot signal of an acquisition subject cannot be conducted while said spreading code is shifted by a predetermined value, said first control means causes said signal search means to conduct the synchronization acquisition operation of the pilot signal, by shifting the phase of generation of the spreading code for receiving by said spreading code generation means from an arbitrarily determined reference phase by said predetermined value at a time.

10. A spread spectrum communication apparatus according to claim 6, further comprising second control means, wherein after the synchronization acquisition of the pilot signal of the acquisition subject has been conducted by said signal search means when power is turned on again, said second control means causes said signal search means to conduct signal search operation for another pilot signal including another short code with different offset of the spreading code, and if another pilot signal having a larger correlation value with the another short code than said pilot signal under acquisition has been detected, said second control means effects such control as to change over the subject of synchronization acquisition to said another pilot signal.

11. A radio communication apparatus for use in a radio communication system, the apparatus communicating a signal with a base station, the signal being spread by a code, the base station broadcasting a pilot signal, comprising:

generating means for generating a plurality of codes during a time period for receiving the pilot signal;

signal search means for conducting synchronization acquisition of the pilot signal on the basis of correlation between each of the generated codes and the received pilot signal and for recognizing a timing information when the pilot signal and the generated code are synchronized; and controlling means for storing the recognized information while a power of the apparatus is turned off and controlling a sequence of generating the codes based on the stored information after the power of the apparatus is turned on.

* * * * *